US012589866B2

(12) United States Patent (10) Patent No.: US 12,589,866 B2

Walpole (45) Date of Patent: Mar. 31, 2026

(54) AIRCRAFT PROPULSION SYSTEM

(71) Applicant: Steve Walpole, Mesa, AZ (US)

(72) Inventor: Steve Walpole, Mesa, AZ (US)

( * ) Notice: Subject to any disclaimer, the term of this patent is extended or adjusted under 35 U.S.C. 154(b) by 203 days.

(21) Appl. No.: 18/484,507

(22) Filed: Oct. 11, 2023

(65) Prior Publication Data

US 2025/0121934 A1 Apr. 17, 2025

(51) Int. Cl.
*B64C 27/12* (2006.01)
*B60L 50/10* (2019.01)

(52) U.S. Cl.
CPC .............. *B64C 27/12* (2013.01); *B60L 50/10* (2019.02)

(58) Field of Classification Search
CPC ...... B64D 35/021; B64D 31/16; B64D 35/08; B64C 27/12
See application file for complete search history.

(56) References Cited

U.S. PATENT DOCUMENTS

| | | | |
|---|---|---|---|
| 2005/0011307 A1 | 1/2005 | Gmirya | |
| 2014/0010652 A1* | 1/2014 | Suntharalingam ... | B64D 35/023 475/5 |
| 2019/0300193 A1 | 10/2019 | Riedel | |
| 2020/0198779 A1 | 6/2020 | Colombo et al. | |

| | | | |
|---|---|---|---|
| 2021/0147076 A1 | 5/2021 | Stearns et al. | |
| 2022/0003240 A1* | 1/2022 | Beck ...................... | F04D 29/086 |
| 2023/0160357 A1* | 5/2023 | Tasker ................. | B64D 35/026 415/122.1 |

FOREIGN PATENT DOCUMENTS

| | | |
|---|---|---|
| CN | 204846368 U | 12/2015 |
| CN | 103968003 B | 8/2016 |
| CN | 107284165 B | 5/2020 |
| EP | 0971155 A1 | 1/2000 |
| WO | 2022014486 | 1/2022 |

* cited by examiner

*Primary Examiner* — Ashesh Dangol

(74) *Attorney, Agent, or Firm* — Schmeiser, Olsen & Watts LLP

(57) ABSTRACT

An aircraft propulsion system is provided. The system may provide improved directional control of an aircraft, eliminating the need for a tail rotor. The system may include a frame connected between a body of the aircraft and a main rotor having a torque effect on the body. The system may also include a first motor mounted to the frame and configured to spin in a first rotational direction. The system may further include a second motor mounted to the frame and configured to spin in a second rotational direction opposite the first rotational direction to create a force opposite the motion imparted to the body by the torque effect of powering the main rotor. The second motor and the first motor drive the main rotor in the first rotational direction. The aircraft is steered around a vertical axis by adjusting the speed of the first motor and the second motor.

13 Claims, 16 Drawing Sheets

178

179

178

179

179

185

179

185

184

179

185

AIRCRAFT PROPULSION SYSTEM

BACKGROUND OF THE INVENTION

State of the Art

Helicopters and other rotorcraft can take off and land vertically and can hover in the air. They are used in a variety of applications, including transportation of people and cargo, search and rescue operations, and military missions. One of the key components of a helicopter is the tail rotor, which is used to counteract the torque generated by powering the main rotor and provide directional control. Tail rotors, however, are complex and expensive components that require regular maintenance and can be a source of noise, vibration, draft and added weight. Additionally, tail rotors are also a safety concern, as they can cause accidents if they are damaged—such as by a bird strike or missile hit—or they come into contact with obstacles or people on the ground.

A conventional alternative system for counteracting the main rotor torque generally uses a jet of air, fired through a vent on the tail of the helicopter to build a high volume of low-pressure air, which exits through two slots and creates a boundary layer flow of air along the tail boom of the helicopter, causing the downwash from the main rotor to hug the tail boom, producing lift. However, the conventional system requires a heavier tail boom to handle the high pressures. Moreover, the conventional system has a limited anti torque capability restricting it to smaller helicopters.

Accordingly, what is needed is an alternative propulsion system for helicopters or other rotorcrafts that uses a novel combination of aerodynamic and mechanical features to counteract the torque generated by the main rotor, that improves efficiency and increases stability and provides greater control over the helicopter's movement, and that provides a safer, quieter, and more cost-effective alternative to traditional tail rotors.

SUMMARY OF THE TECHNOLOGY

The disclosed lift or propulsion apparatus according to various aspects of the subject technology may provide improved directional control of an aircraft, eliminating the need for a tail rotor. The propulsion apparatus may comprise a frame connected between a body of the aircraft and a main rotor having a torque effect on the body. The propulsion apparatus may also comprise a first motor mounted to the frame and configured to spin in a first rotational direction. The propulsion apparatus may further comprise a second motor mounted to the frame and configured to spin in a second rotational direction opposite the first rotational direction to create a force opposite the motion imparted to the body by the torque effect of powering the main rotor, wherein the second motor and the first motor drive the main rotor in the first rotational direction, and wherein the aircraft is steered around a vertical axis by adjusting the speed of the first motor and the second motor.

BRIEF DESCRIPTION OF THE DRAWINGS

A more complete understanding of the subject technology may be derived by referring to the detailed description when considered in connection with the following illustrative figures. In the following figures, like reference numbers refer to similar elements and steps throughout the figures.

DETAILED DESCRIPTION OF EMBODIMENTS

Figure 1:
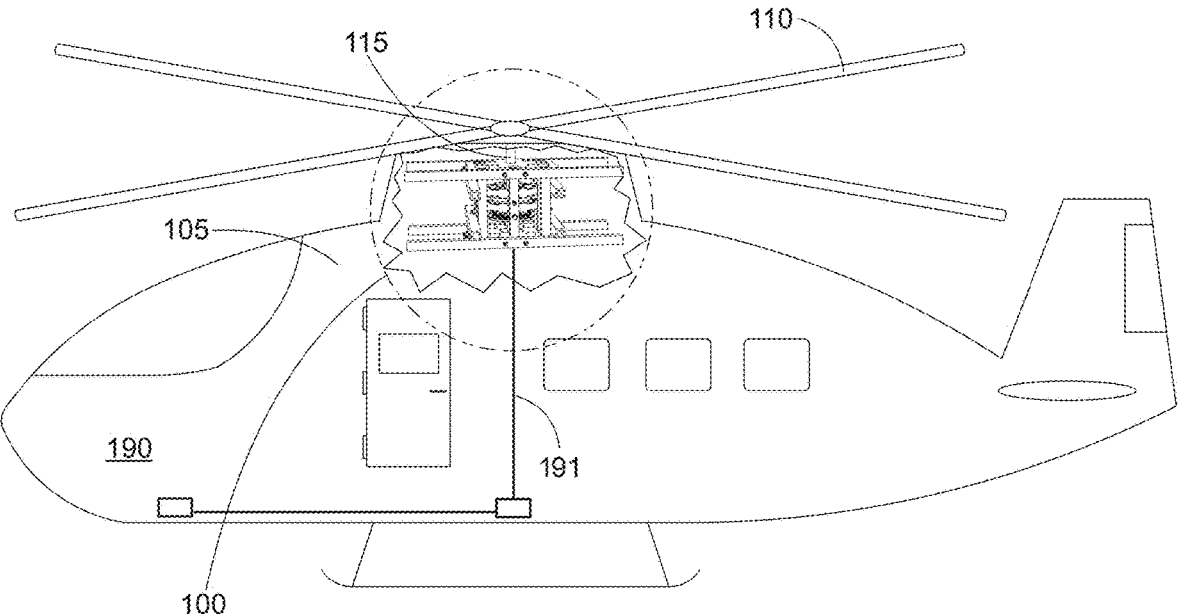
FIG. 1 representatively illustrates an aircraft and a propulsion system in accordance with an embodiment of the subject technology.

The subject technology may be described in terms of functional components. Such functional components may be realized by any number of components configured to perform the specified functions and achieve the various results. For example, the subject technology may employ various bars, coupling components, frames, gears, gear assemblies, gear belts, gear tracks, motors, platforms, control cables, control systems, support members, and the like, which may carry out a variety of functions. In addition, the subject technology may be practiced in conjunction with any one of various aircrafts, and the propulsion system described herein is merely one exemplary application for the technology.

Referring to FIGS. 1-13, an exemplary propulsion system 100 for counteracting a torque generated by a main rotor 110 may provide increased stability and greater directional control of an aircraft, as well as provide a safer, quieter, and more cost-effective alternative to traditional tail rotors or conventional propulsion systems. For the purposes of this application, the term "aircraft" includes, but is not limited to, any type of aircraft, such as a "helicopter," a "rotorcraft," and the like. The propulsion system 100 may comprise a frame 120 connected between an aircraft body 105 and the main rotor 110, a first motor 140 configured to spin in a first rotational direction, and a second motor 160 configured to spin in a second rotational direction opposite the first rotational direction to create a force opposite the motion imparted to the aircraft body 105 by the torque effect of the main rotor 110. The first motor 140 and the second motor 160 may be configured to drive a rotor shaft 115 with the main rotor 110, which may be coupled thereto, such that the rotor shaft 115 spins or rotates in the first rotational direction. A pilot of the aircraft may adjust the speed of the first motor 140 and the second motor 160 to steer the aircraft around its vertical axis.

The frame 120 may comprise a top platform 125 positioned proximate to a first end 117 of the rotor shaft 115, a base platform 130 positioned proximate to the aircraft body 105 opposite the top platform 125, and a plurality of bars 135. The plurality of bars 135 may be arranged in a perpendicular manner and may extend from the top platform 125 to the base platform 130 to form an open frame housing. In one embodiment, the plurality of bars 135 may be connected to the top platform 125 and the base platform 130 at a midpoint of the frame housing. The top platform 125 may comprise an opening 127 (see FIG. 9) for inserting the rotor shaft 115 therethrough. The top platform 125 may comprise a top rotatable platform 129 (see FIGS. 8 and 9)

that is configured to receivably engage a first end 117 of the rotor shaft 115. Similarly, the base platform 130 may comprise a bottom rotatable platform 132 that is configured to receivably engage a second end 119 of the rotor shaft 115 (see FIGS. 2, 8, 9, and 12). The top rotatable platform 129 and the bottom rotatable platform 132 may each be freely rotatable. When the frame 120 is assembled and/or connected to the aircraft body 105, the rotor shaft 115 may be contained or positioned within the open frame housing, extending from the main rotor 110 to the bottom rotatable platform 132.

As shown in FIGS. 3A-D, the plurality of bars 135 may be arranged to provide a stable and secure mounting platform for the first motor 140 and the second motor 160, preventing any unwanted movement or displacement during flight. The plurality of bars 135 may comprise any suitable size or shape, such as a square or a circular cross-section. The plurality of bars 135 may comprise a solid or hollow cross-section. The modular design and easy assembly of the frame 120 make it highly versatile and adaptable for different types of aircraft. The frame 120 may be constructed from a variety of suitable high-strength materials, designed to withstand the harsh and demanding operating conditions encountered during aircraft flight. For example, the frame 120 may be constructed with steel, aluminum, titanium, composite material, and the like.

Referring to FIGS. 4A-D, the first motor 140 may comprise a first motor case 142 and a first stator 144 having a first plurality of field coils 146 wound around the first motor case 142 and positioned along a circumference of the first motor case 142. In addition, the first motor 140 may comprise a first rotor 148 for generating rotational movement. The first rotor 148 may be circular in shape and may comprise a plurality of magnetic poles 151 positioned circumferentially around the first rotor 148. The location of each field coil 146 may correspond to a location of one of the plurality of magnetic poles 151 of the first rotor 148 with an air gap 152 therebetween. The arrangement of the field coils 146 may be designed to interact with the poles 151 to generate a magnetic field that produces rotational force on the first rotor 148 in a manner that allows for efficient energy transfer and helps to minimize energy loss during operation. The first rotor 148 may comprise a first central opening 154 for snugly receiving the rotor shaft 115 therethrough to provide a secure and snug connection between the first rotor 148 and the rotor shaft 115, such that as the first rotor 148 rotates in the first rotational direction, the rotor shaft 115 also rotates in the first rotational direction, providing the necessary lift and propulsion for the aircraft to fly. The first central opening 154 may securely hold the first rotor 148 in place, even under the high forces and vibrations experienced during flight. The first motor 140 may be constructed with any high-strength material that can withstand the high forces and stresses generated during operation, such as steel, aluminum, titanium, composite material, and the like.

Modifications may be made to the first motor 140 without departing from the scope of the subject technology. For example, in an alternative embodiment, the field coils 146 may be wound around the first motor case 142 or the first stator 144, and the plurality of magnetic poles 151 may be contained or positioned within circumferentially around the first rotor 148. It will be appreciated that in other embodiments, various modifications may be made. Additionally, the first motor 140 may consist of 6 to 12 field windings and magnetic poles. The selection of the number and placement of the field windings and magnetic poles can be tailored to optimize the stability of the propulsion system, thereby serving as a safety feature.

Figure 2:
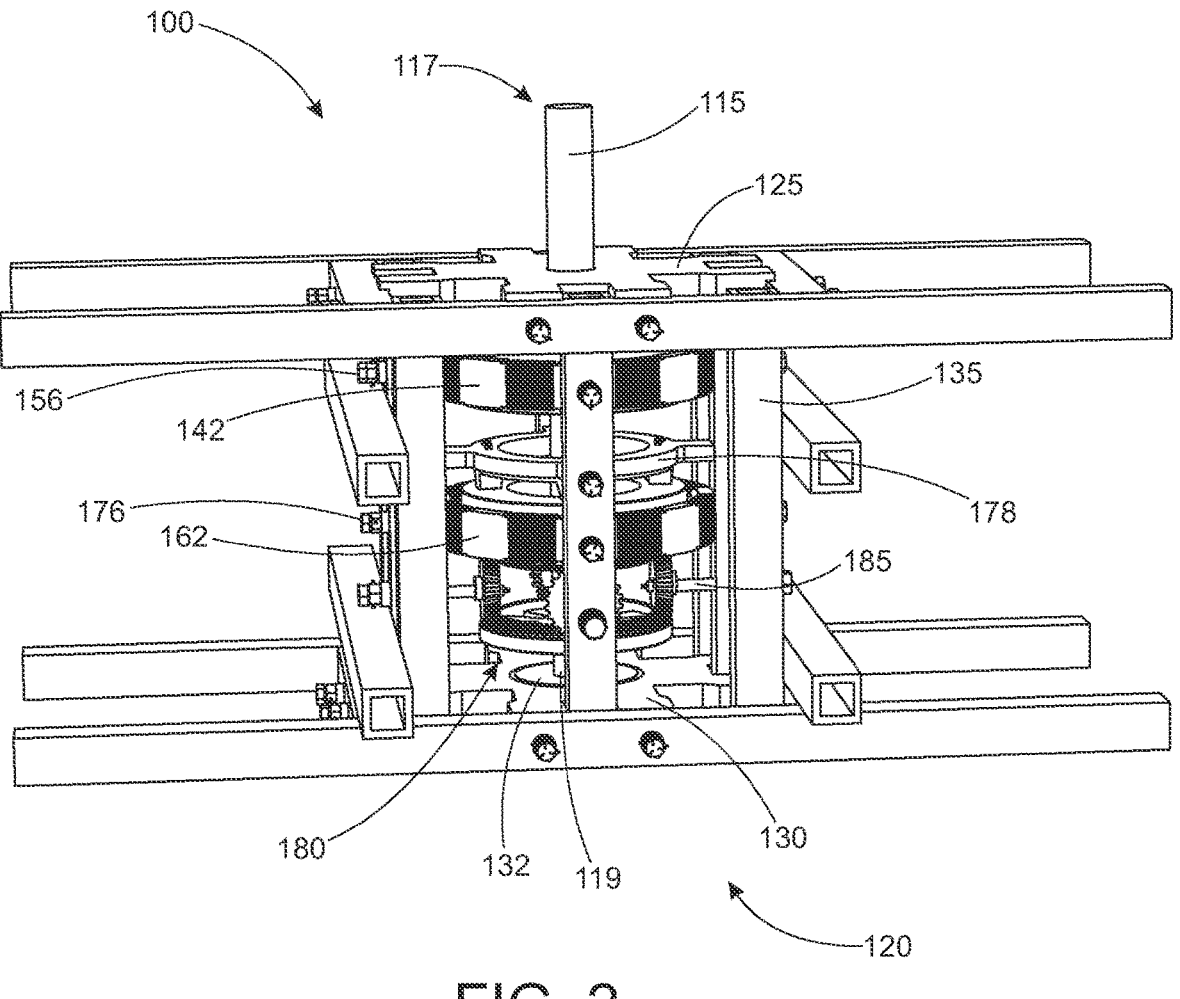
FIG. 2 representatively illustrates a propulsion system in accordance with an embodiment of the subject technology.
Figures 3A, 3B, 3C, 3D:
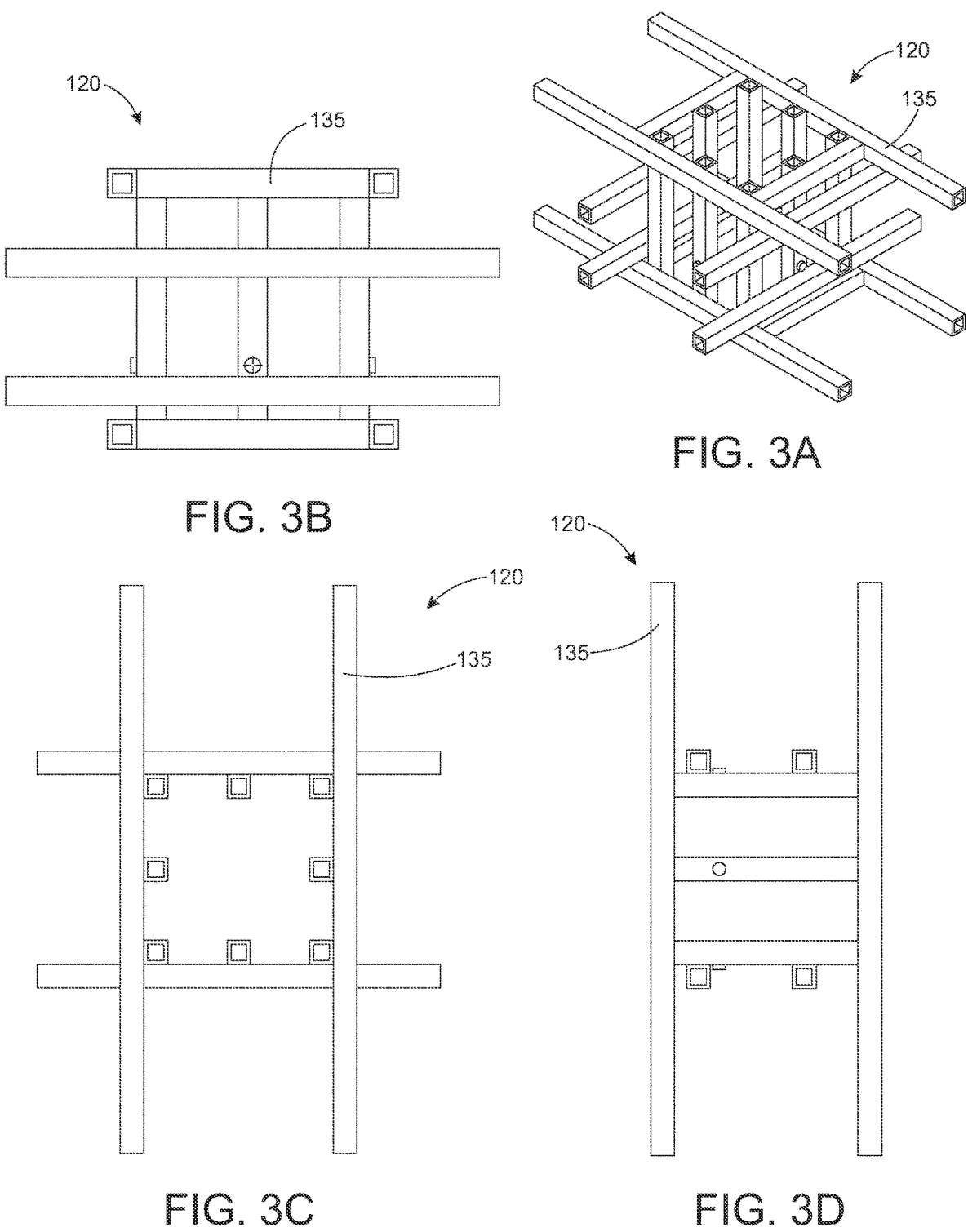
FIG. 3A representatively illustrates a perspective view of a frame of a propulsion system in accordance with an embodiment of the subject technology.
FIG. 3B representatively illustrates a side view of a frame of a propulsion system in accordance with an embodiment of the subject technology.
FIG. 3C representatively illustrates a top view of a frame of a propulsion system in accordance with an embodiment of the subject technology.
FIG. 3D representatively illustrates a side view of a frame of a propulsion system in accordance with an embodiment of the subject technology.
Figure 4A:
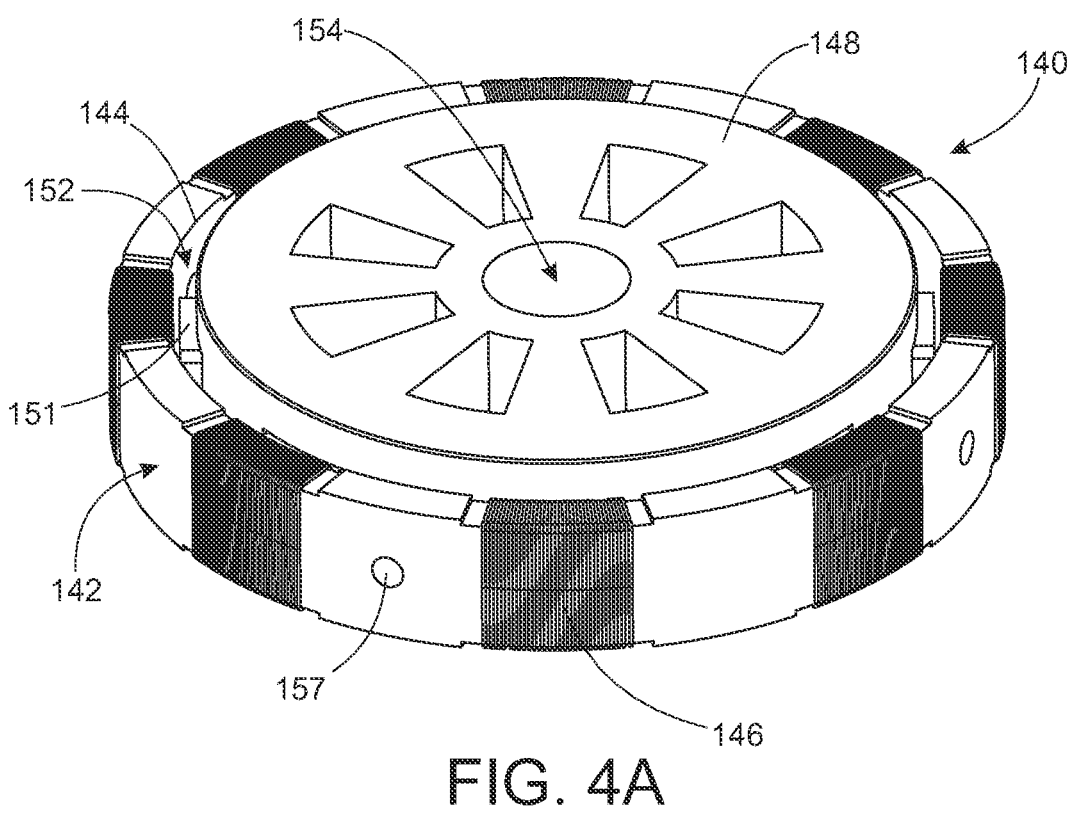
FIG. 4A illustrates a top perspective view of a first motor of a propulsion system in accordance with an embodiment of the subject technology.
Figure 4B:
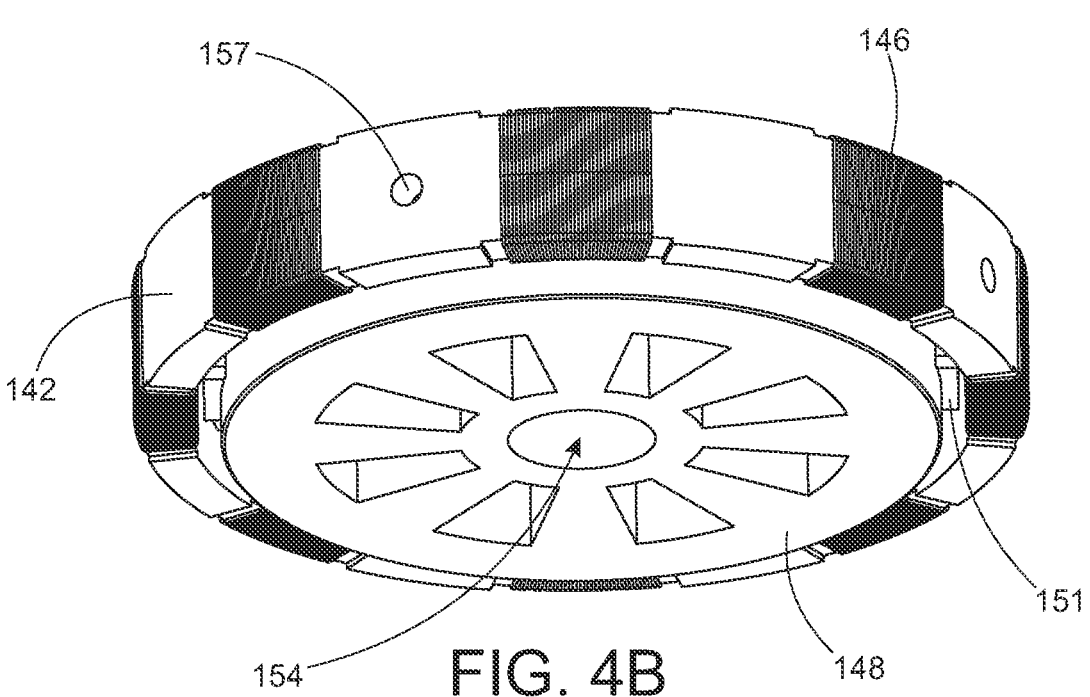
FIG. 4B illustrates a bottom perspective view of the first motor shown in FIG. 4A.
Figure 4C:
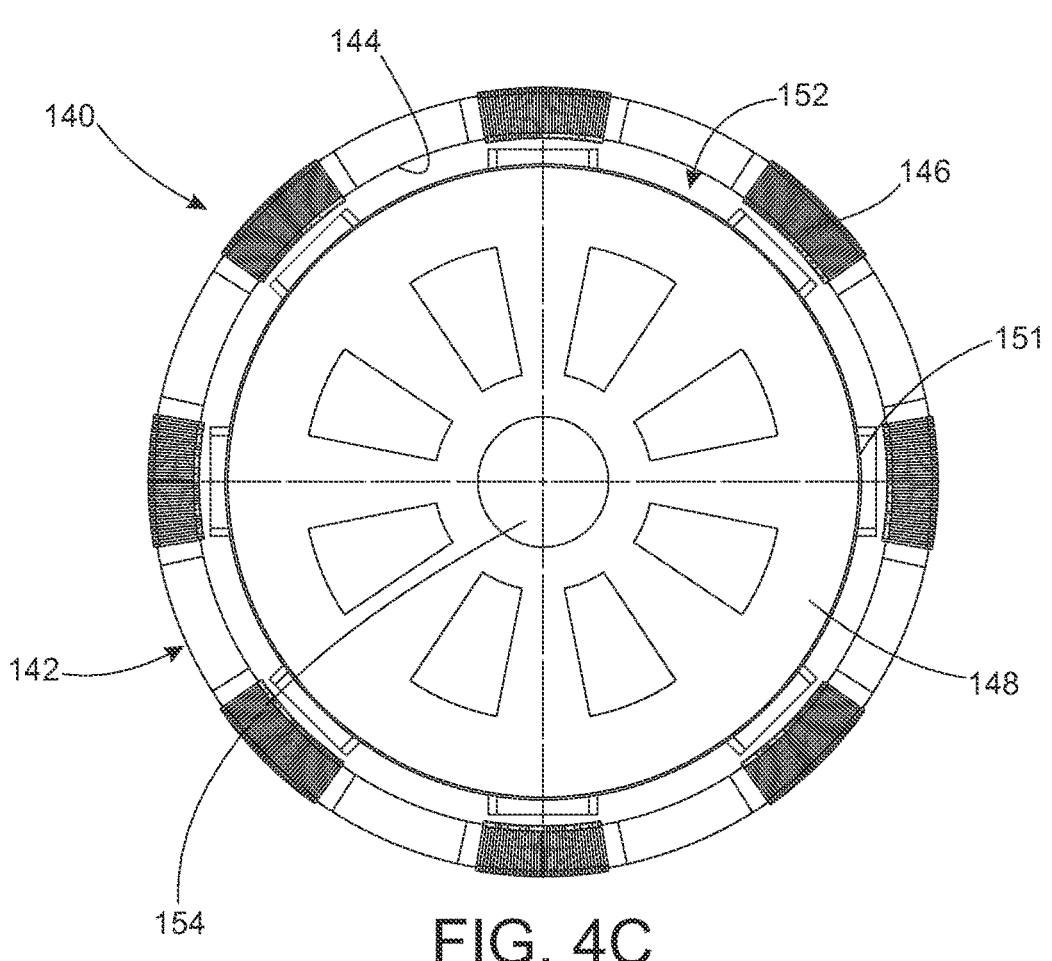
FIG. 4C illustrates a top view of the first motor shown in FIG. 4A.
Figure 4D:
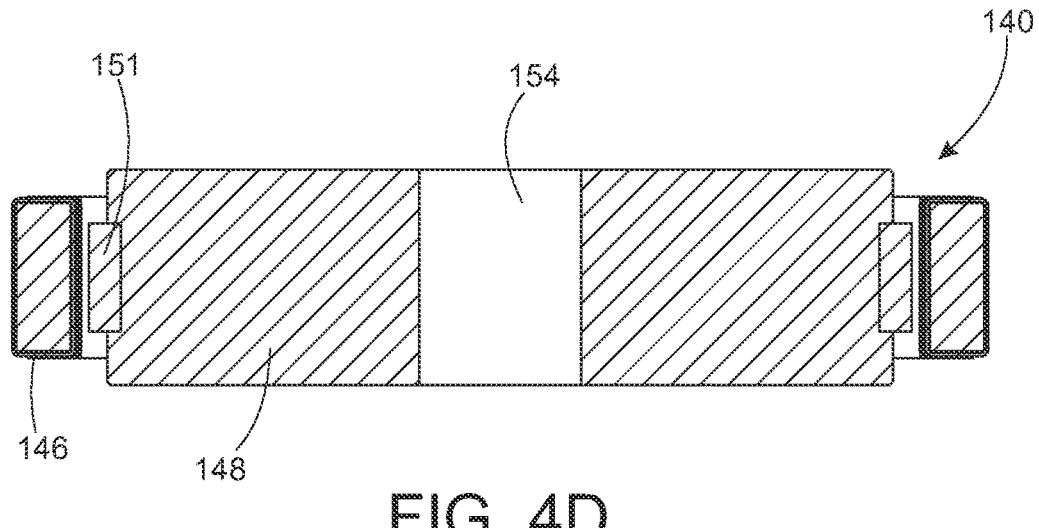
FIG. 4D illustrates a cross section side view of the first motor shown in FIG. 4A.
Figure 5A:
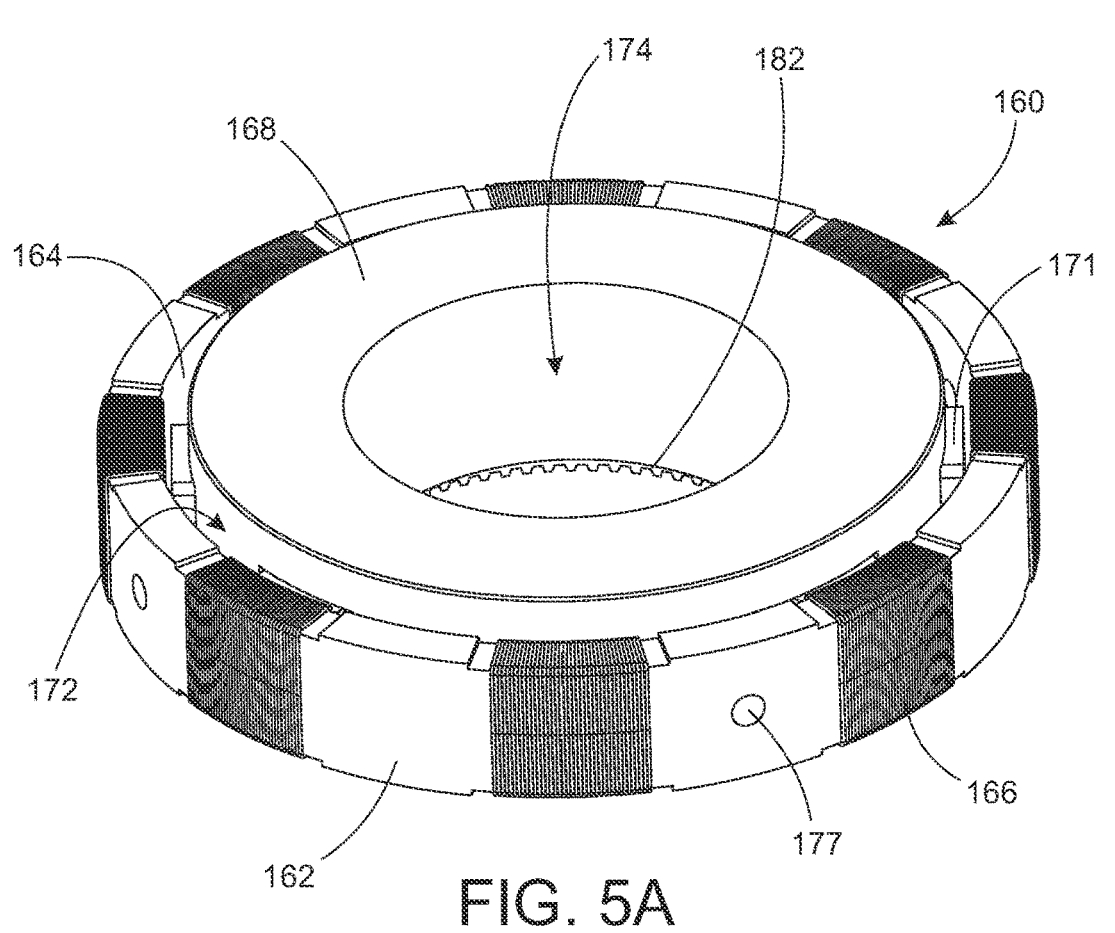
FIG. 5A illustrates a top perspective view of a second motor of a propulsion system in accordance with an embodiment of the subject technology.
Figure 5B:
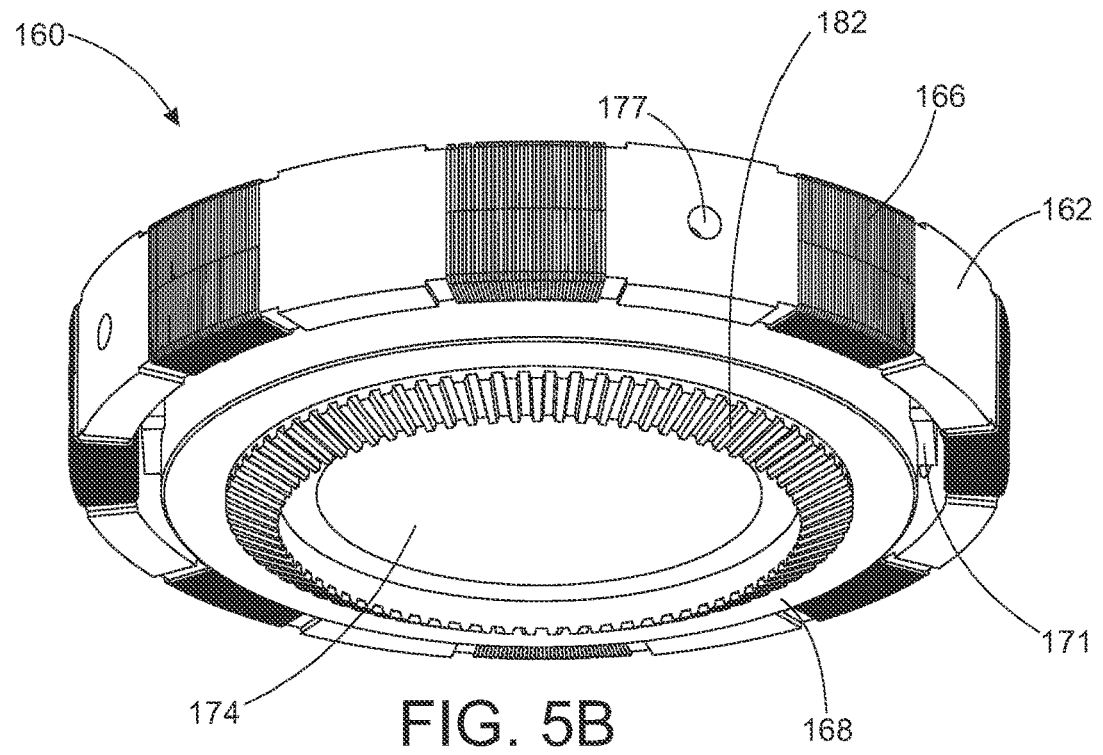
FIG. 5B illustrates a bottom perspective view of the second motor shown in FIG. 5A.
Figure 5C:
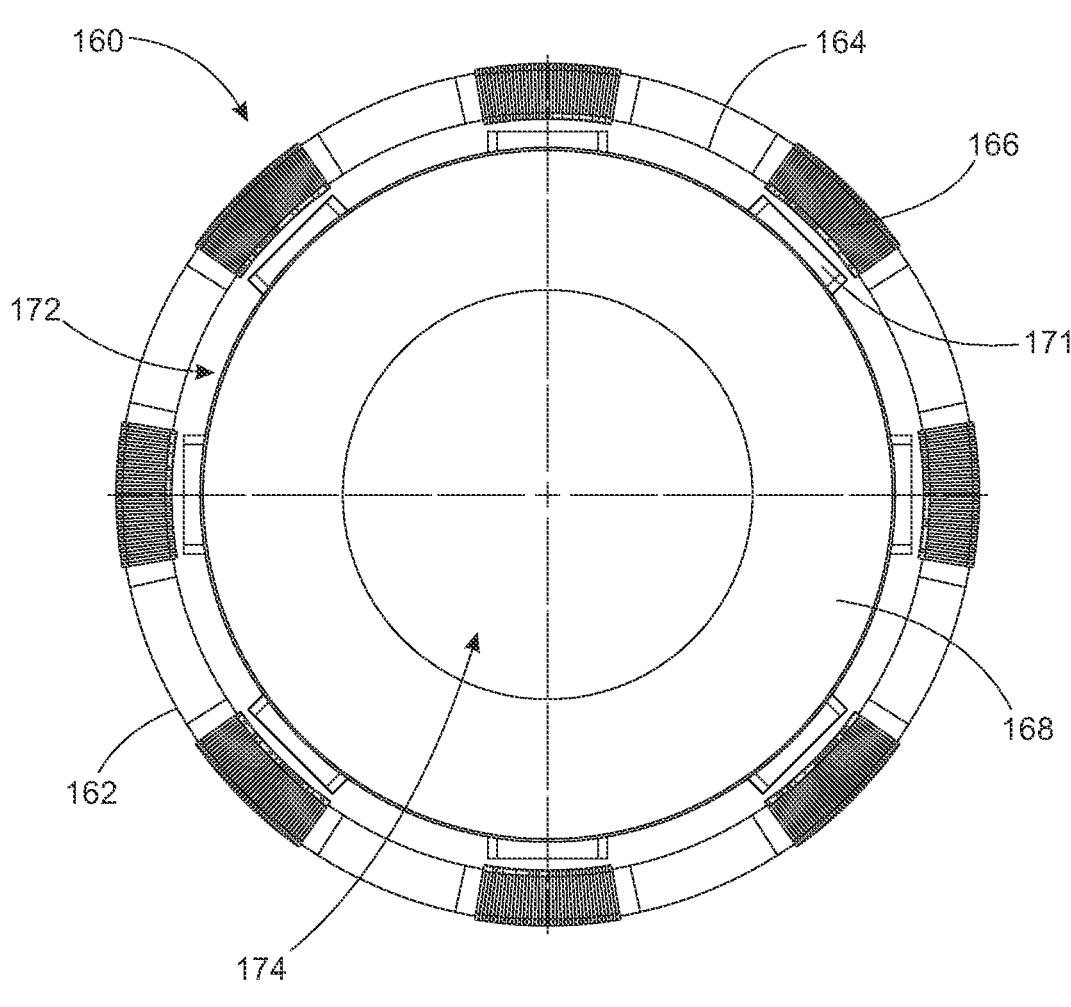
FIG. 5C illustrates a top view of the second motor shown in FIG. 5A.
Figure 5D:
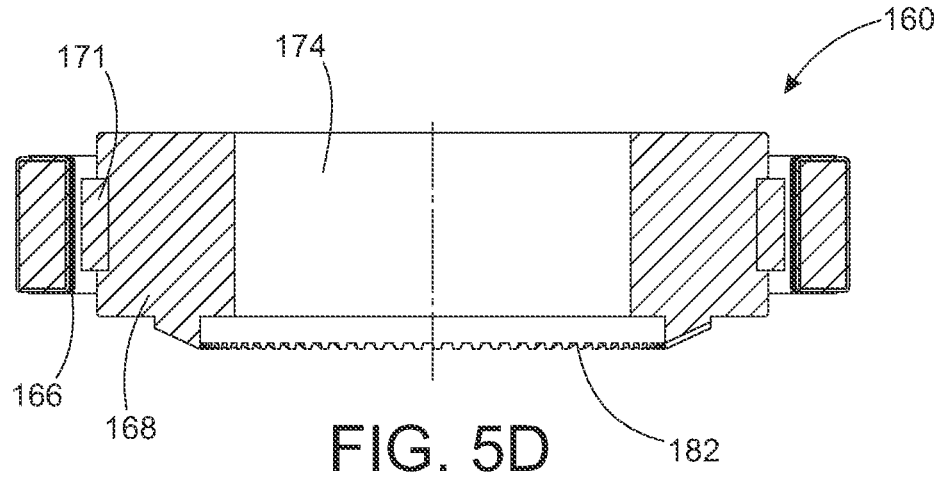
FIG. 5D illustrates a cross section side view of the second motor shown in FIG. 5A.
Figure 6A:
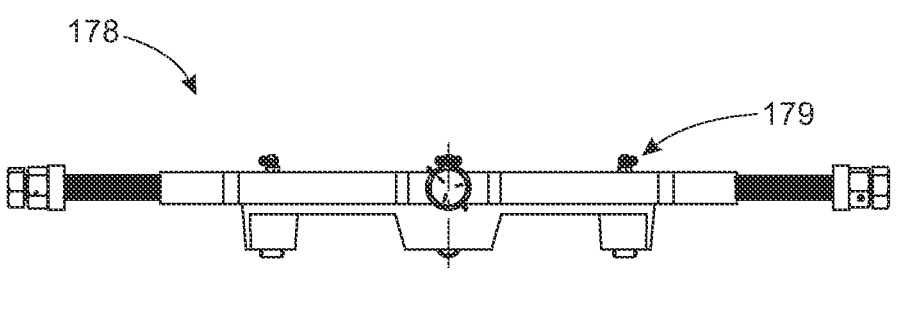
FIG. 6A illustrates a side view of a support body of a propulsion system in accordance with an embodiment of the subject technology.
Figure 6B:
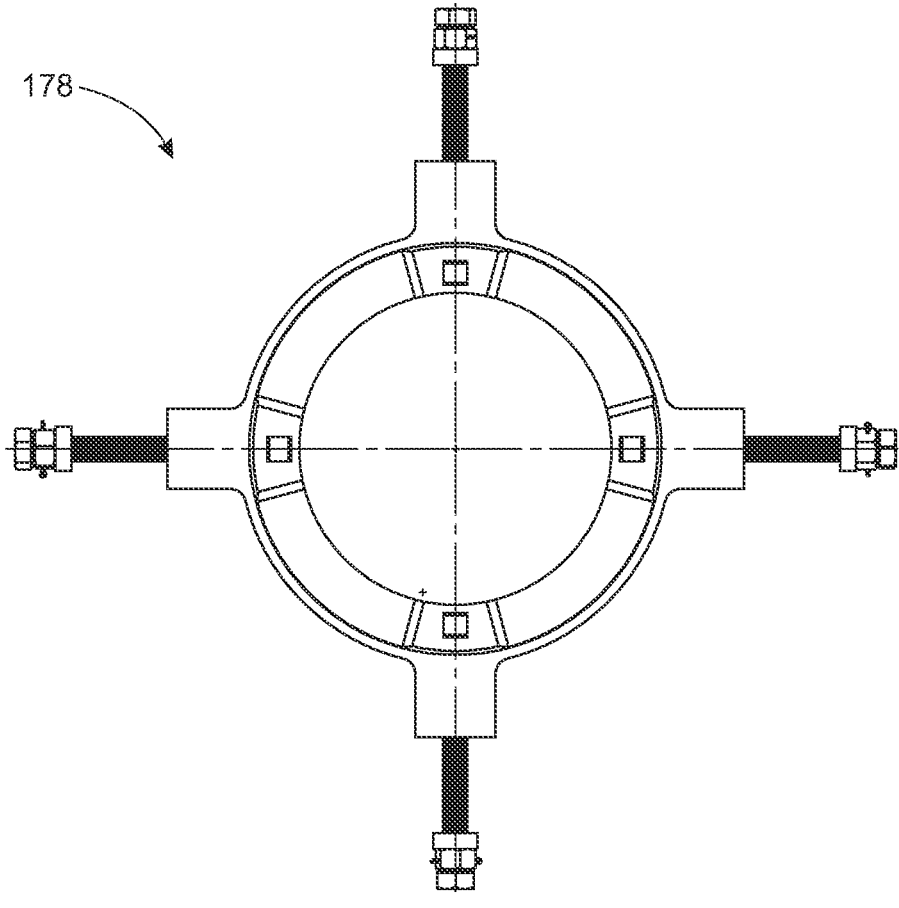
FIG. 6B illustrates a bottom view of a support body of a propulsion system in accordance with an embodiment of the subject technology.
Figure 6C:
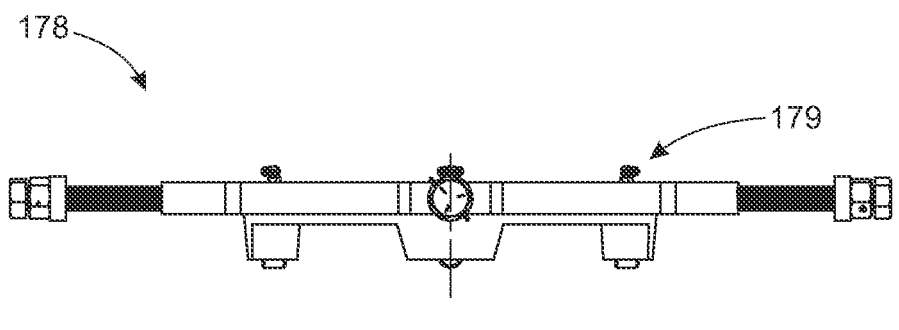
FIG. 6C illustrates a side view of a support body of a propulsion system in accordance with an embodiment of the subject technology.
Figure 6D:
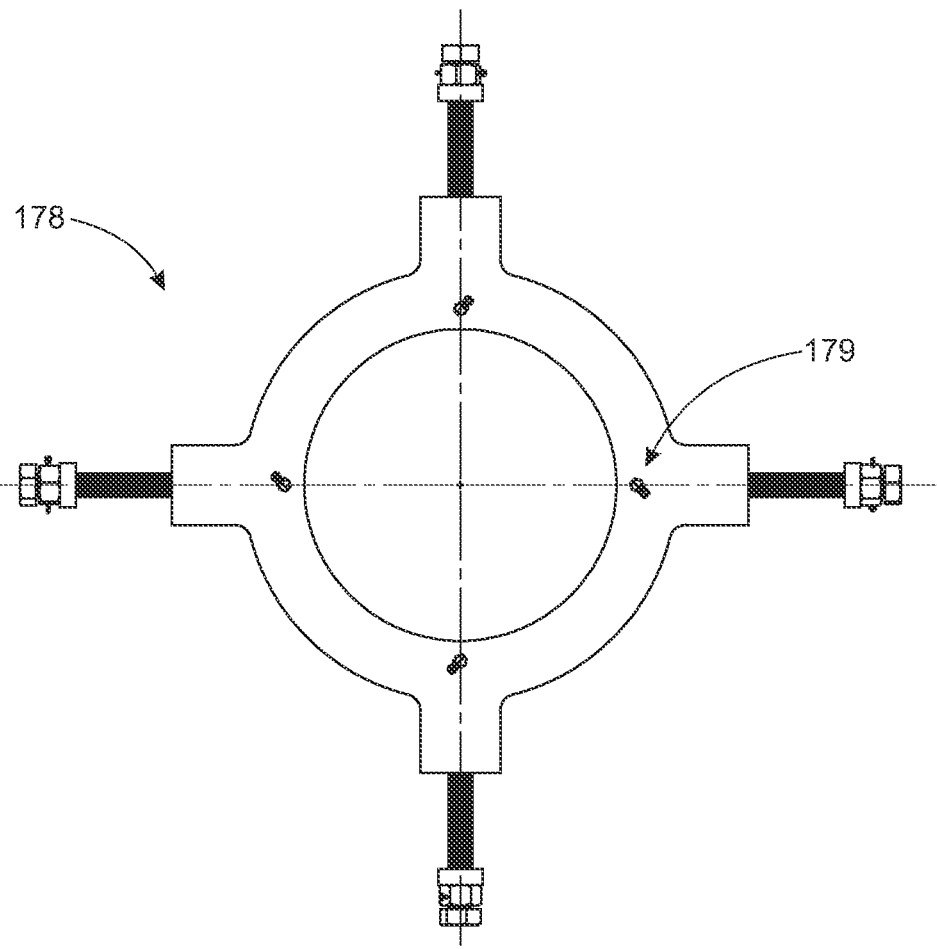
FIG. 6D illustrates a top view of a support body of a propulsion system in accordance with an embodiment of the subject technology.
Figures 7A, 7B, 7C:
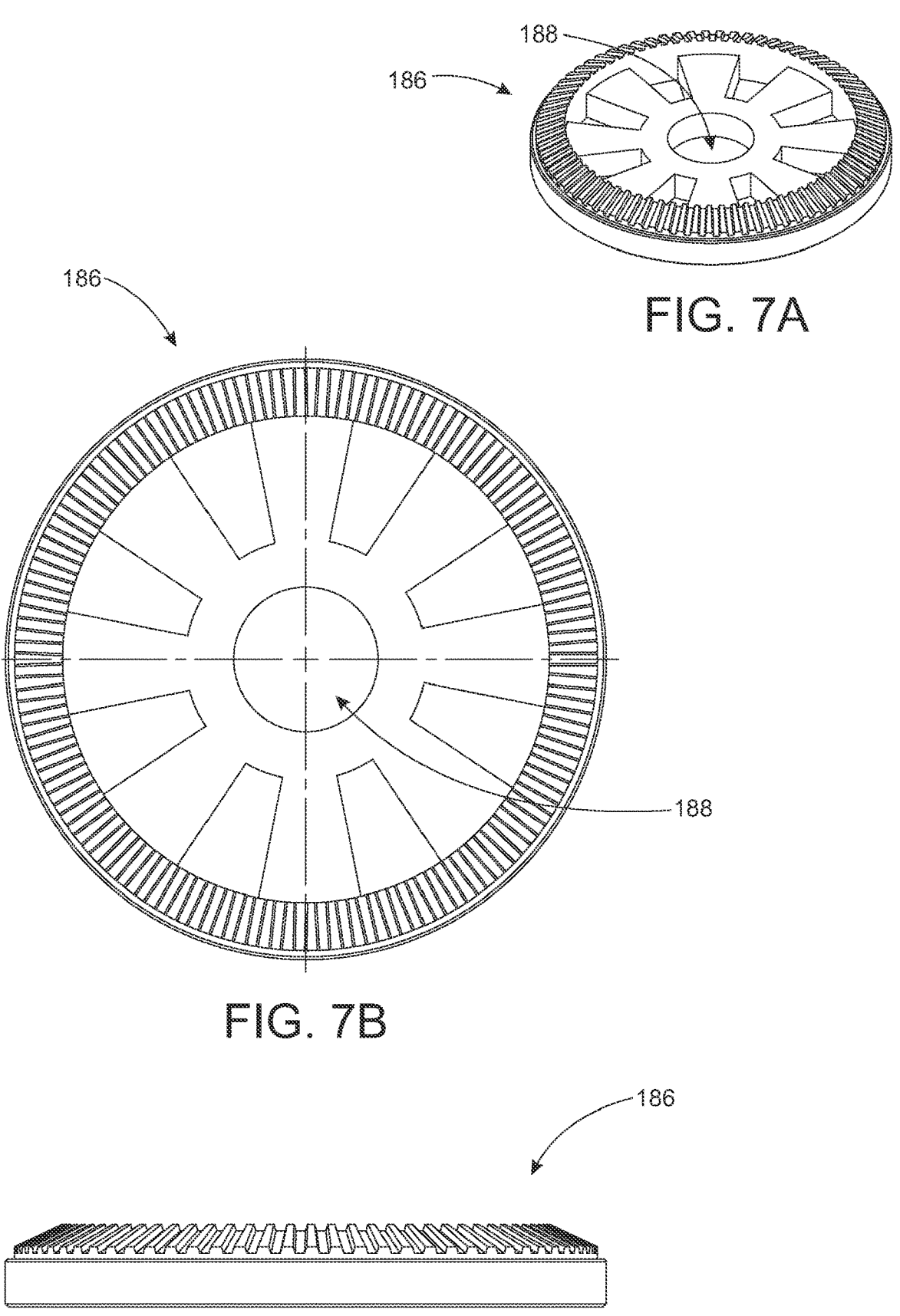
FIG. 7A illustrates a perspective view of a gear of a propulsion system in accordance with an embodiment of the subject technology.
FIG. 7B illustrates a top view of a gear of a propulsion system in accordance with an embodiment of the subject technology.
FIG. 7C illustrates a side view of a gear of a propulsion system in accordance with an embodiment of the subject technology.
Figure 8:
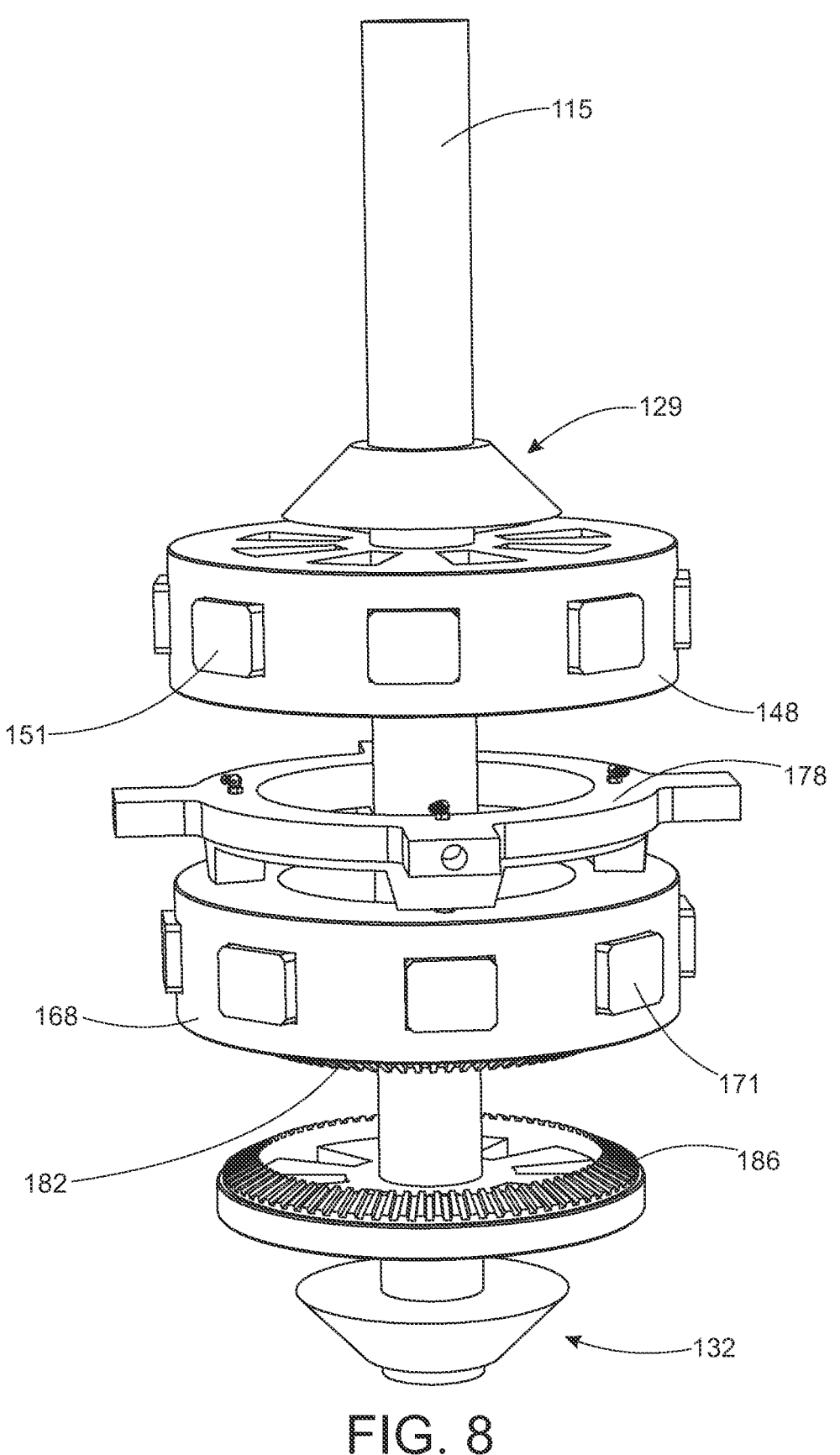
FIG. 8 illustrates a portion of a first motor and a second motor installed to a rotor shaft of an aircraft in accordance with an embodiment of the subject technology.
Figure 9:
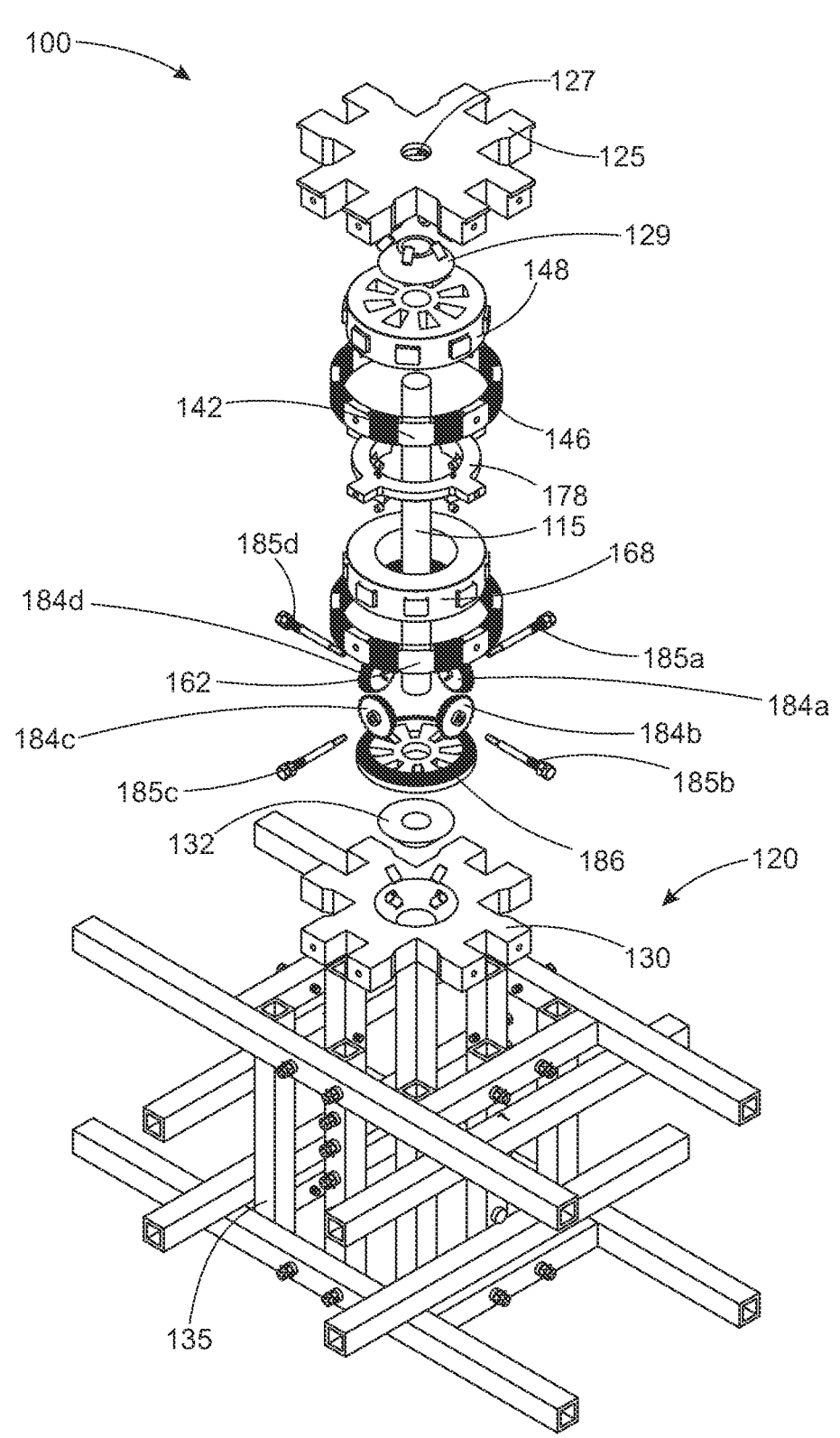
FIG. 9 illustrates an exploded perspective view of a propulsion system in accordance with an embodiment of the subject technology.
Figure 10:
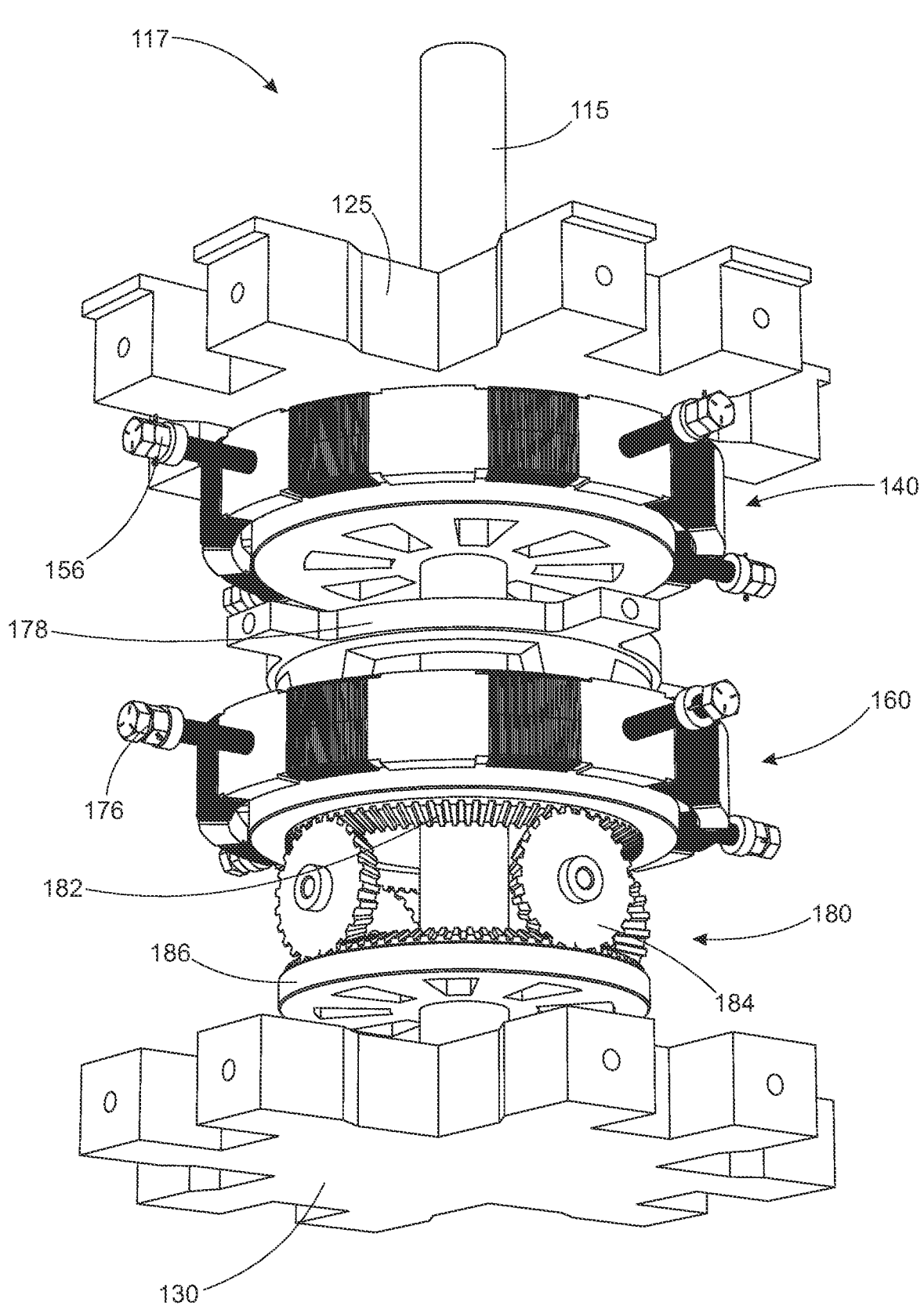
FIG. 10 illustrates a first motor and a second motor installed to a rotor shaft of an aircraft in accordance with an embodiment of the subject technology.
Figure 11:
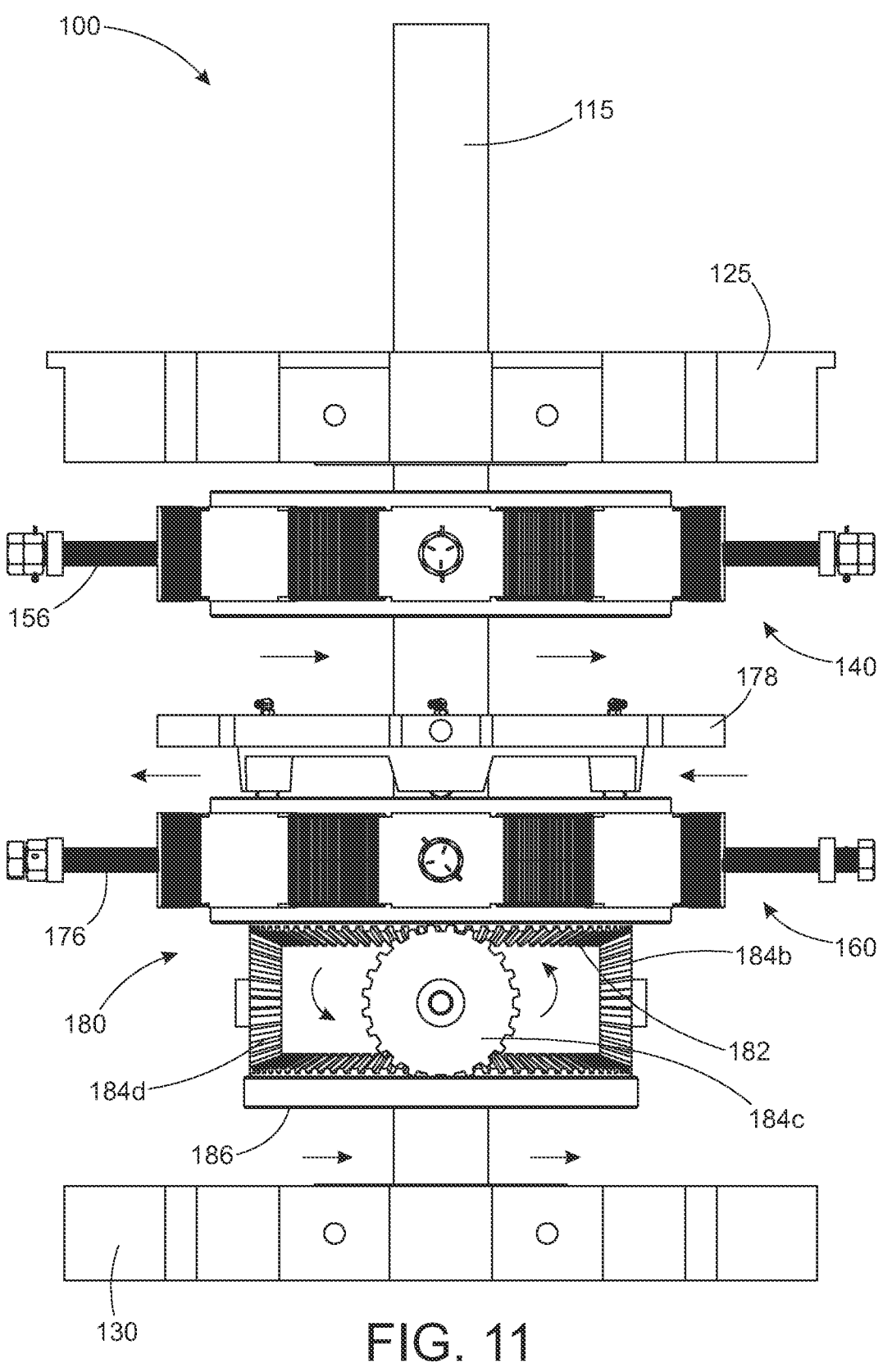
FIG. 11 illustrates a front view of a portion of a propulsion system installed to a rotor shaft of an aircraft in accordance with an embodiment of the subject technology.
Figure 12:
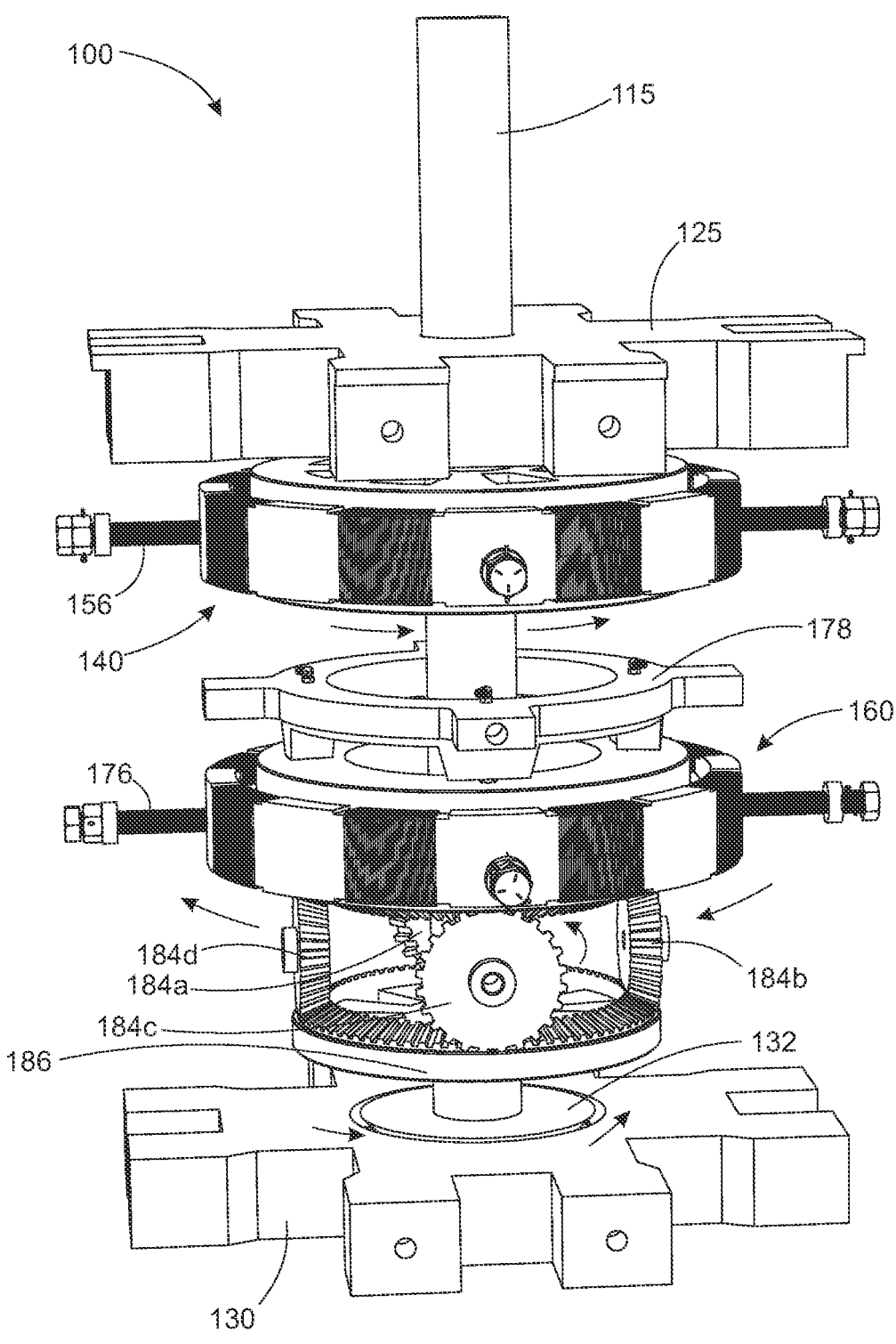
FIG. 12 illustrates a perspective view of a portion of a propulsion system installed to a rotor shaft of an aircraft in accordance with an embodiment of the subject technology.
Figure 13A:
FIG. 13A illustrates a side view of a coupling component of a propulsion system in accordance with an embodiment of the subject technology.
Figure 13B:
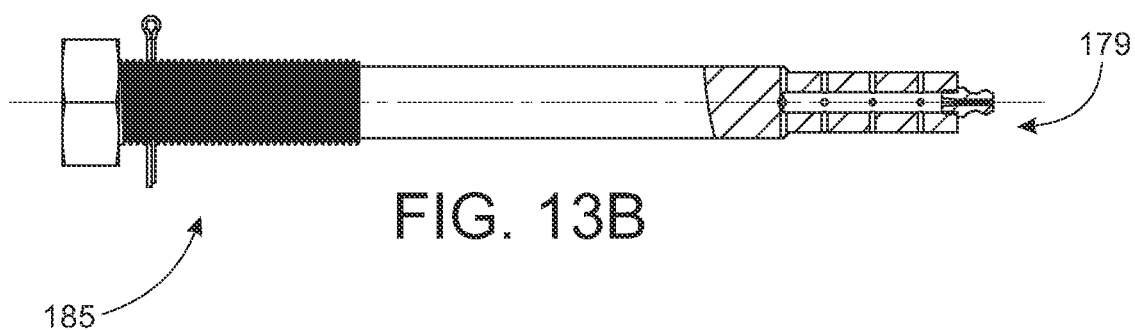
FIG. 13B illustrates a side view of a coupling component of a propulsion system in accordance with an embodiment of the subject technology.
Figure 13C:
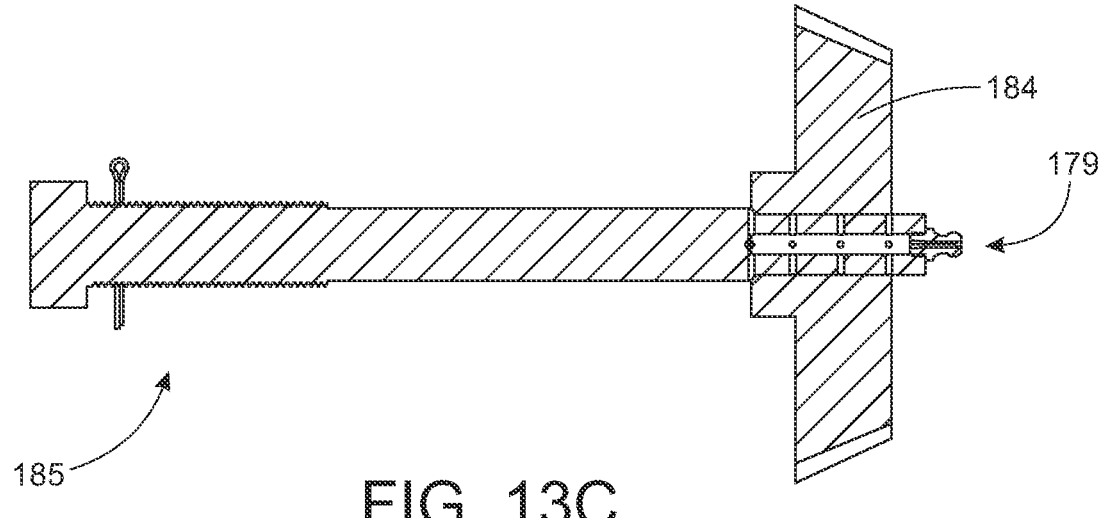
FIG. 13C illustrates a side view of a longitudinal section of a coupling component installed at a gear of a propulsion system in accordance with an embodiment of the subject technology.

Referring now to FIGS. 5A-D, the second motor 160 may comprise a second motor case 162 and a second stator 164 having a second plurality of field coils 166 wound around the second motor case 162 and positioned along a circumference of the second motor case 162. In addition, the second motor 160 may comprise a second rotor 168 that is configured to spin in the second rotational direction opposite the first rotational direction. The second rotor 168 may be circular in shape and may comprise a second plurality of magnetic poles 171 positioned circumferentially around the second rotor 168. The location of each field coil 166 may correspond to a location of one of the second plurality of magnetic poles 171 of the second rotor 168 with an air gap 172 therebetween. The arrangement of the field coils 166 may be designed to interact with the poles 171 to generate a magnetic field that produces rotational force on the second rotor 168 in a manner that allows for efficient energy transfer and helps to minimize energy loss during operation. The second rotor 168 may comprise a second central opening 174 that is substantially larger than the diameter of the rotor shaft 115 to allow the rotor shaft 115 to be inserted through the second central opening 174 without making direct contact with the second rotor 168. The second rotor 168 may be coupled to the rotor shaft 115 by a gear assembly 180, such as shown in FIGS. 2, 10, and 11, where the second rotor 168 is configured to spin the rotor shaft 115, via the gear assembly 180, in the first rotational direction. The second motor 160 may be constructed with any high-strength material that can withstand the high forces and stresses generated during operation, such as steel, titanium, aluminum, composite material, and the like.

Modifications may be made to the second motor 160 without departing from the scope of the subject technology. For example, in an alternative embodiment, the field coils 166 may be wound around the second motor case 162 or the second stator 164, and the plurality of magnetic poles 171 may be contained or positioned within circumferentially around the second rotor 168. It will be appreciated that in other embodiments, various modifications may be made. Additionally, the first motor 140 and the second motor 160 may each consist of 6 to 12 field windings and magnetic poles. The selection of the number and placement of the field windings and magnetic poles can be tailored to optimize the stability of the propulsion system, thereby serving as a safety feature.

As shown in FIGS. 2, 10, 11, and 12, the first motor 140 may be mounted to the frame 120 using a first plurality of coupling components 156 that extend radially outward from an exterior surface of the first motor case 142. The coupling components 156 may be positioned at regular intervals around the circumference of the first motor case 142 and are designed to provide a secure and stable way to attach the first motor 140 to the frame 120. Similarly, the second motor 160 may be mounted to the frame 120 using a second plurality of coupling components 176 extending radially outward from an exterior surface of the second motor case 162. The coupling components 176 may be positioned at regular intervals around the circumference of the second motor case 162 and are designed to provide a secure and stable way to attach the second motor 160 to the frame 120. In one embodiment, the first motor 140 and the second motor 160 may be vertically stacked, where the first motor 140 and the second motor 160 are mounted in a parallel configuration, with one motor positioned above the other. For example, in one embodiment, the first motor 140 may be positioned above the second motor 160. In an alternative embodiment, the second motor 160 may be positioned above the first motor 140.

The first motor case 142 and the second motor case 162 may comprise a first plurality of apertures 157 and a second plurality of apertures 177, respectively. The first plurality of apertures 157 may be configured to receive one of the first plurality of coupling components 156 therethrough for fixedly coupling the first motor 140 to the frame 120. Similarly, the second plurality of apertures 177 may be configured to receive one of the second plurality of coupling components 176 therethrough for fixedly coupling the second motor 160 to the frame 120. The first plurality of coupling components 156 and the second plurality of coupling components 176 may comprise any suitable mechanical connectors, such as rivets, screws, bolts, and the like.

The gear assembly 180 may comprise a gear track 182 (see FIGS. 8 and 10-12) coupled to the second rotor 168 around its circumferential surface. In one embodiment, the gear track 182 may be angled relative to the circumferential surface to provide a secured meshed connection between the gears. As shown in FIGS. 9-12, the gear assembly 180 may also comprise a plurality of gears 184a, 184b, 184c, and 184d rotationally coupled via within the frame 120 and oriented perpendicular to the second rotor 168. The plurality of gears 184a-d may be coupled within the frame 120 by coupling components 185a-d (see FIG. 9). The gear assembly 180 may further comprise a second gear 186 coupled directly to the rotor shaft 115 and oriented parallel to the second rotor 168. The second gear 186 may comprise a central opening 188 for snugly receiving the rotor shaft 115 therethrough to provide a secure and snug connection between the second rotor 168 and the rotor shaft 115, so that the second rotor 168 rotates in the opposite rotational direction. The plurality of gears 184 may mesh with both the gear track 182 and the second gear 186 such that rotation of the gear track 182, in response to rotation of the second rotor 168, rotates the plurality of gears 184, which in turn, rotates the second gear 186 in the first rotational direction. The plurality of gears 184 may be translation gears, such that the first rotor 148 and the second rotor 168 may spin in opposite directions, i.e., the first rotational direction and the second rotational direction, respectively, but drive the main rotor 110 in the same direction, i.e., the first rotational direction, providing the necessary lift and propulsion for the aircraft to fly.

In one design variation, the second rotor 168 may be connected through meshed gears to the gear assembly 180, which functions as a dual-purpose gear. This dual-function gear is capable of rotating freely within the propulsion system 100. Its primary role is to transfer power from the rotating second rotor 168 to the second gear 186 or any other gear wheel located at the bottom of the propulsion system 100. The gear wheel may be securely attached to the rotor shaft 115, ensuring that the main rotor 110 spins in the same direction as the first motor 140.

Additionally, the gear assembly 180 serves a secondary function as part of the second motor 160. It prevents the second rotor 168 from jostling, falling down, or moving laterally during the operation of the aircraft. The gear assembly 180, when engaged, ensures that the second rotor 168 remains inside the second stator 164 and stays connected to a containment ring 178.

The containment ring 178 may be equipped with zerk fittings 179 and roller bearings, which are incorporated into their material for stability and support. In one particular design, the containment ring 178 consists of four roller bearings, each featuring zerk fittings 179 for lubrication. The zerk fittings 179 may allow for easy maintenance by providing access points to inject lubricating grease into the roller bearings, prolonging the lifespan of the components. The roller bearings may be strategically arranged to work in conjunction with a translation gear or another gear of the gear assembly 180, ensuring smooth operation and keeping the second rotor 168 firmly in place.

Together, the roller bearings and the translation gear collaborate to ensure smooth and efficient operation within the propulsion system 100. They contribute to the stability and functionality of the system, allowing for reliable and effective power transmission.

The propulsion system 100 may further comprise control tubes or a control system 190 for receiving control signals. The control system 190 may connect pedals or other instruments in the cockpit of the aircraft to the propulsion system 100. The control system 190 may be configured to increase or decrease the speed of the first motor 140 and the second motor 160 in response to receiving the control signals from the pedals or other instruments in the cockpit. The control system 190 may comprise electronic controls, manual controls, control cables 191, hydraulic controls, and autopilot systems.

In operation, the propulsion system 100 counteracts the torque produced by powering the main rotor 110, which prevents the aircraft body 105 from spinning in the opposite direction of the main rotor 110 rotation. The propulsion system 100 achieves this by directing or exerting a force on the aircraft body 105 in a horizontal direction, perpendicular to the main rotor's direction of rotation. Accordingly, the aircraft may be steered around its vertical axis by changing the direction of the propulsion system's force. The direction of the propulsion system's force may be controlled by changing the rotational speed of the first motor 140 and the second motor 160. The pilot can adjust the rotational speed of the first and second motors 140, 160 using the foot pedals or other instruments in the cockpit, which are connected to the control system 190. By adjusting the relative speeds of the first motor 140 and the second motor 160, the pilot can control the helicopter's yaw or heading. In this regard, the control system 190 allows the pilot to steer the aircraft around its vertical axis by adjusting the amount of power (or current) supplied to each motor. The pilot can increase the amount of power supplied to one of the motors while simultaneously decreasing the amount of power supplied to the other motor, and vice versa.

The particular implementations shown and described are illustrative of the technology and its best mode and are not intended to otherwise limit the scope of the subject technology in any way. Indeed, for the sake of brevity, conventional manufacturing, connection, preparation, and other functional aspects of the apparatus may not be described in detail. Furthermore, the connections and points of contact shown in the various figures are intended to represent exemplary physical relationships between the various elements. Many alternative or additional functional relationships or physical connections may be present in a practical system.

In the foregoing description, the technology has been described with reference to specific exemplary embodiments. Various modifications and changes may be made, however, without departing from the scope of the subject technology as set forth. The description and figures are to be regarded in an illustrative manner, rather than a restrictive one and all such modifications are intended to be included within the scope of the subject technology. Accordingly, the scope of the technology should be determined by the generic embodiments described and their legal equivalents rather than by merely the specific examples described above. For example, the components and/or elements recited in any apparatus embodiment may be combined in a variety of permutations to produce substantially the same result as the subject technology and are accordingly not limited to the specific configuration recited in the specific examples.

Benefits, other advantages, and solutions to problems have been described above with regard to particular embodiments. Any benefit, advantage, solution to problems or any element that may cause any particular benefit, advantage, or solution to occur or to become more pronounced, however, is not to be construed as a critical, required, or essential feature or component.

The terms "comprises," "comprising," or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the subject technology, in addition to those not specifically recited, may be varied, or otherwise particularly adapted to specific environments, manufacturing specifications, design parameters or other operating requirements without departing from the general principles of the same.

The subject technology has been described above with reference to an exemplary embodiment. However, changes and modifications may be made to the exemplary embodiment without departing from the scope of the subject technology. These and other changes or modifications are intended to be included within the scope of the subject technology.

The invention claimed is:

1. A propulsion apparatus for providing directional control of an aircraft, comprising:

a frame connected between a body of the aircraft and a main rotor having a torque effect on the body, wherein the frame comprises:

a top platform positioned proximate a first end of a rotor shaft, wherein the top platform comprises an opening for inserting the rotor shaft therethrough;

a base platform positioned proximate the aircraft body, wherein the base platform comprises a freely rotating platform configured to receivably engage a second end of the rotor shaft opposite the first end; and a plurality of bars extending from the top platform to the base platform to form an open frame housing, wherein the rotor shaft is at least partially contained within the open frame housing;

a first motor mounted to the frame and configured to spin in a first rotational direction; and a second motor mounted to the frame and configured to spin in a second rotational direction opposite the first rotational direction to create force opposite a motion imparted to the body by the torque effect of powering the main rotor, wherein the second motor and the first motor drive the main rotor in the first rotational direction, and wherein the aircraft is steered around a vertical axis by adjusting speeds of the first motor and the second motor.

2. The propulsion apparatus of claim 1, wherein the frame is coupled to an exterior surface of the aircraft body.

3. The propulsion apparatus of claim 1, wherein the first motor and the second motor are vertically stacked.

4. The propulsion apparatus of claim 1, wherein the freely rotating platform comprises a conical plug, stopper, or cap.

5. The propulsion apparatus of claim 1, wherein the first motor comprises:

a first motor case connected to the frame by a first plurality of coupling components;

a first stator and a first plurality of field coils arranged circumferentially around the first stator; and a first rotor and a first plurality of magnetic poles arranged circumferentially around the first rotor;

the first rotor comprising a first central opening for snugly receiving the rotor shaft therethrough such that the first rotor is coupled directly to the rotor shaft, wherein the first rotor is configured to spin the rotor shaft in the first rotational direction.

6. The propulsion apparatus of claim 1, wherein the second motor comprises:

a second motor case connected to the frame by a second plurality of coupling components;

a second stator and a second plurality of field coils arranged circumferentially around the second stator; and a second rotor and a second plurality of magnetic poles arranged circumferentially around the second rotor;

the second rotor comprising a second central opening substantially larger than the diameter of the rotor shaft for receiving the rotor shaft therethrough, wherein the second rotor is coupled to the rotor shaft by a gear assembly, and wherein the second rotor is configured to spin the rotor shaft, via the gear assembly, in the first rotational direction.

7. The propulsion apparatus of claim 6, wherein the gear assembly comprises:

a gear track coupled to the second rotor;

a first gear rotationally coupled within the frame and oriented perpendicular to the second rotor; and a second gear coupled directly to the rotor shaft and oriented parallel to the second rotor, wherein the first gear meshes with both the gear track and the second gear such that rotation of the gear track, in response to rotation of the second rotor, rotates the first gear, which in turn, rotates the second gear in the first rotational direction.

8. A propulsion system for use with an aircraft, comprising:

a propulsion apparatus for providing directional control of the aircraft, comprising:

a frame connected between a body of the aircraft and a main rotor having a torque effect on the body, wherein the frame comprises:

a top platform positioned proximate a first end of a rotor shaft, wherein the top platform comprises an opening for inserting the rotor shaft therethrough;

a base platform positioned proximate the aircraft body, wherein the base platform comprises a freely rotating platform configured to receivably engage a second end of the rotor shaft opposite the first end; and a plurality of bars extending from the top platform to the base platform to form an open frame housing, wherein the rotor shaft is at least partially contained within the open frame housing;

a first motor mounted to the frame and configured to spin in a first rotational direction; and a second motor mounted to the frame and configured to spin in a second rotational direction opposite the first rotational direction to create a force opposite a motion imparted to the body by the torque effect of powering the main rotor, wherein the second motor and the first motor drive the main rotor in the first rotational direction, and wherein the aircraft is steered around a vertical axis by adjusting rotational speeds of the first motor and the second motor; and control cables configured to control the rotational speeds of the first motor and the second motor, comprising:

in response to receiving a first signal, increase or decrease the rotational speed of the first motor; and in response to receiving a second signal, increase or decrease the rotational speed of the second motor.

9. The propulsion system of claim 8, wherein the frame is coupled to an exterior surface of the aircraft body.

10. The propulsion system of claim 8, wherein the first motor and the second motor are vertically stacked.

11. The propulsion system of claim 8, wherein the first motor comprises:

a first motor case connected to the frame by a first plurality of coupling components;

a first stator and a first plurality of field coils arranged circumferentially around the first stator; and a first rotor and a first plurality of magnetic poles arranged circumferentially around the first rotor;

the first rotor comprising a first central opening for snugly receiving the rotor shaft therethrough such that the first rotor is coupled directly to the rotor shaft, wherein the first rotor is configured to spin the rotor shaft in the first rotational direction.

12. The propulsion system of claim 8, wherein the second motor comprises:

a second motor case connected to the frame by a second plurality of coupling components;

a second stator and a second plurality of field coils arranged circumferentially around the second stator; and a second rotor and a second plurality of magnetic poles arranged circumferentially around the second rotor;

the second rotor comprising a second central opening substantially larger than the diameter of the rotor shaft for receiving the rotor shaft therethrough, wherein the second rotor is coupled to the rotor shaft by a gear assembly, and wherein the second rotor is configured to spin the rotor shaft, via the gear assembly, in the first rotational direction.

13. The propulsion system of claim 12, wherein the gear assembly comprises:

a gear track coupled to the second rotor;

a first gear rotationally coupled within the frame and oriented perpendicular to the second rotor; and a second gear coupled directly to the rotor shaft and oriented parallel to the second rotor, wherein the first gear meshes with both the gear track and the second gear such that rotation of the gear track, in response to rotation of the second rotor, rotates the first gear, which in turn, rotates the second gear in the first rotational direction.

* * * * *